Nov. 6, 1962 G. R. LOUTHAN 3,062,128
BARBECUE BRAZIER
Filed Aug. 5, 1959 2 Sheets-Sheet 1

INVENTOR.
George R. Louthan
BY Nathan H. Kraus
Frank H. Marks
Attorneys

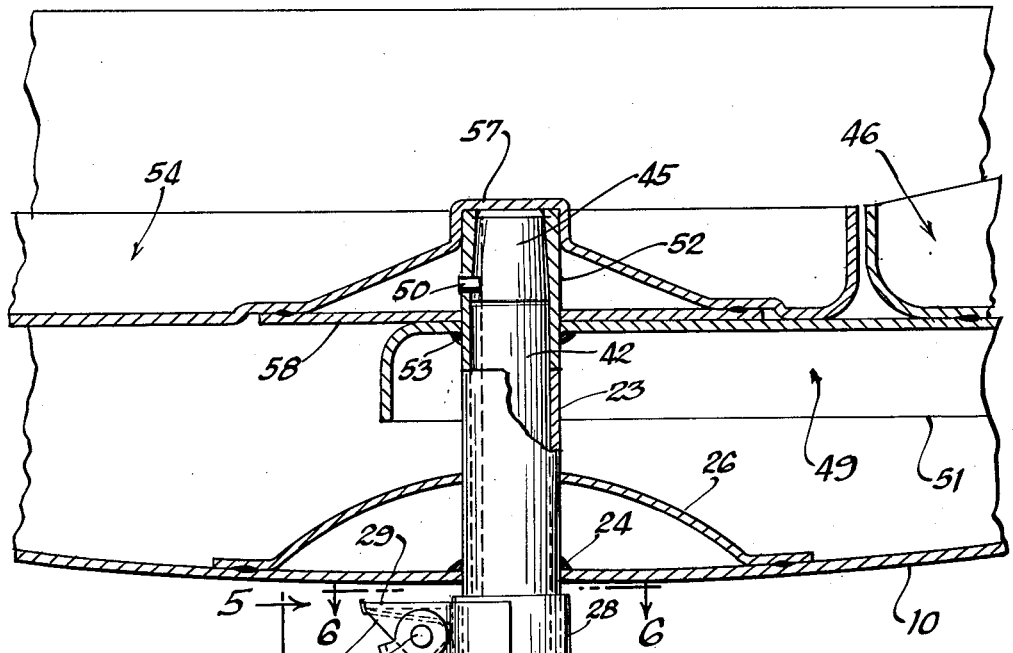
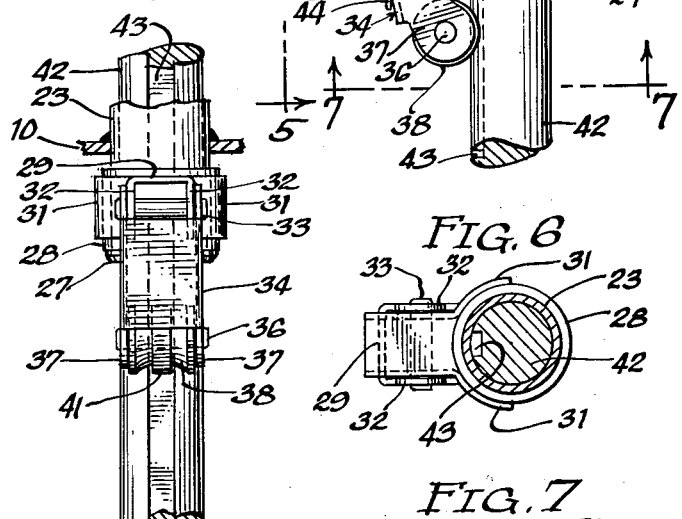
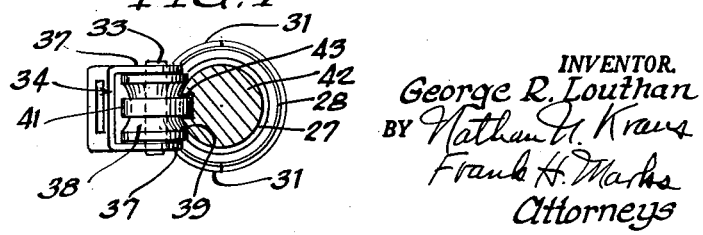

United States Patent Office 3,062,128
Patented Nov. 6, 1962

3,062,128
BARBECUE BRAZIER
George R. Louthan, Kankakee, Ill., assignor to Sears, Roebuck and Co., Chicago, Ill., a corporation of New York
Filed Aug. 5, 1959, Ser. No. 831,837
4 Claims. (Cl. 99—446)

This invention relates to improvements in barbecue braziers generally, and more particularly to braziers of the type having rotatable spits supported above the fire bowl of the brazier.

One of the objects of my invention is the provision in a barbecue brazier of a novel drip pan for catching and collecting the drippings of meats being cooked, thereby preventing fire flare-ups and conserving such drippings and juices for use in basting or preparation of sauces.

Another object of my invention is a provision in a barbecue brazier of an auxiliary fire bowl housed within the main fire bowl and arranged so that there may be established a specific area of desired heat intensity whereby to conserve fuel and concentrate the heat to effect cooking with a relatively high degree of efficiency and economy.

A further object of my invention is the provision of an auxiliary fire bowl and drip pan which are pivotally supported and movable to any position radially within the fire bowl.

Still a further object of my invention is the provision of a novel arrangement wherein the auxiliary fire bowl and drip pan are in substantially counter-balanced relation, thereby minimizing stresses on the supporting spindle member.

Other and further objects and advantages of my invention will become apparent from the following description when considered in connection with the accompanying drawings in which:

FIG. 4 is a fragmentary, cross-sectional view similar to FIG. 3, but on an enlarged scale;

FIG. 5 is a fragmentary elevational view looking in the direction of the arrows 5—5 of FIG. 4;

FIG. 6 is a cross-sectional view taken on line 6—6 of FIG. 4; and

FIG. 7 is a cross-sectional view taken on line 7—7 of FIG. 4.

Figure 2:
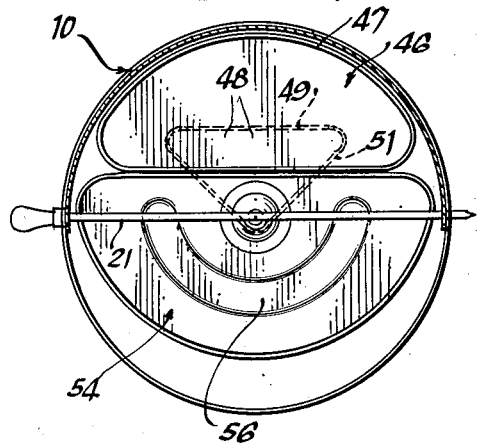
FIG. 2 is a cross-sectional view taken substantially on line 2—2 of FIG. 1.
Figure 1:
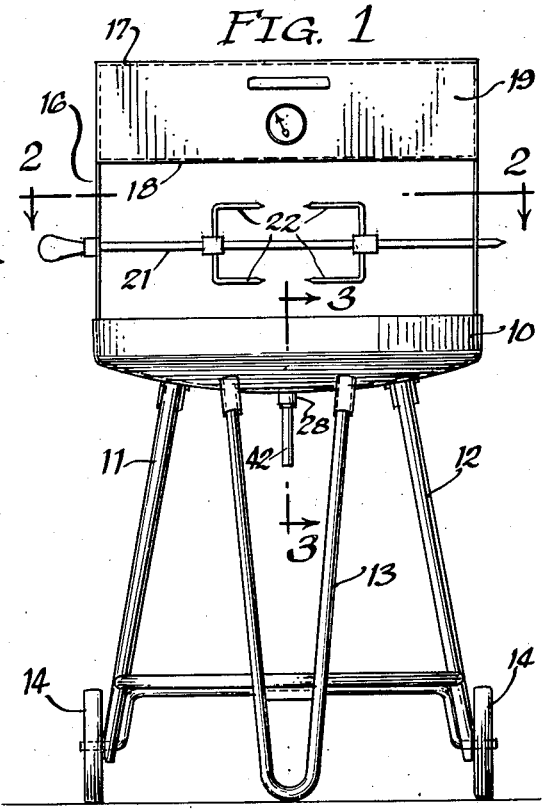
FIGURE 1 is a front elevational view of a barbecue brazier embodying the present invention.

Referring to the drawings, the barbecue brazier of my invention, comprises a fire bowl 10 of generally dished form supported on a plurality of legs 11, 12 and 13, the legs 11 and 12 having wheels 14 attached at their lower ends to afford easy portability to the brazier. There is further provided a substantially, semi-circular hood 16 supported on the upper edge of the bowl 10 with the upper portion of the hood being enclosed by top, bottom, and front walls 17, 18 and 19 respectively to provide a warming or baking chamber. A spit or skewer 21, provided with adjustable tines or prongs 22, is suitably supported in aligned journals provided in the hood, it being understood that the spit or skewer may be arranged for manual or motorized operation.

Rising through an aperture in the bowl 10 is a tubular bushing 23 which is welded circumferentially thereof to the bowl, as at 24. The bushing 23 also passes through the central aperture in a concavo-convex member 26 which is also welded to the bowl 10. The member 26 serves to keep the hot coals away from the weldment 24 and also affords lateral support to the bushing 23.

The lower end of the bushing 23 is flanged as at 27 to retain a bearing collar 28 to which is attached a channel-shaped member 29, the end portions 31 of the legs of which are arcuately formed to embrace the collar 28 as shown clearly in FIG. 6. The forward leg portions are cut away, as at 32 for purposes of clearance. A pin 33 extends through apertures in the legs and pivotally supports a channel member 34 shaped substantially as illustrated. A pin 36 carried in the free ends of the legs 37 supports a roller 38 which, as seen clearly in FIG. 7, has an arcuate surface 39 and an intermediate annular rib 41.

A spindle 42 provided with a longitudinally extending keyway 43 is received in the bushing 23 and extends above said bushing. The upper end portion 45 of the spindle 42 is tapered, as illustrated in FIG. 4. As will be clearly seen in FIGS. 4 and 7, the surface 39 of the roller 38 engages a portion of the peripheral surface of the spindle 42 with the rib 41 being received in the keyway 43 of the spindle. A torsion spring 44 serves to urge the channel member 34 in a counterclockwise direction, as viewed in FIG. 4, whereby the roller 38 is caused to apply pressure on one side of the spindle 42 for a purpose as will be hereinafter explained. It will be apparent that the collar 28, member 34 and spindle 42 are locked together for rotation although the spindle 42 is movable axially relative to the collar 28.

Figure 3:
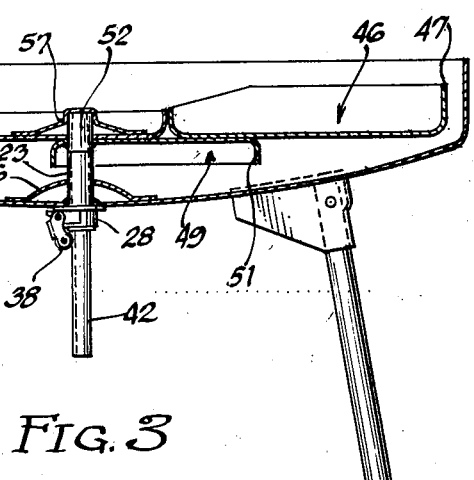
FIG. 3 is a cross-sectional view, on an enlarged scale taken substantially on line 3—3 of FIG. 1, with certain parts in elevation.

An auxiliary fire bowl 46 shaped substantially in plan view, as illustrated in FIG. 2, is provided with a perimetric flange 47 and is spot welded as at 48 to a supporting member 49 which is substantially triangular in plan, having a depending rigidifying flange 51. A bushing 52 rises through an opening in the supporting member 49 and is welded thereto by a circular weldment 53. The bore of the bushing 52, at its upper end, is tapered to afford a cooperating seat for the upper end of the spindle 45. A pin 50 is driven through an aperture in the bushing 52 and extends into the keyway 43 locking the bushing to the spindle. Thus, the auxiliary fire bowl 46 is supported on the spindle 42 for rotational movement with the spindle 42 about the axis of the spindle. Accordingly the fire bowl may be moved to any position radially of the axis of the spindle. A drip pan 54 shaped substantially in plan view as illustrated in FIG. 2, is provided with an arcuate well portion 56 and with an embossing 57 affording on the underside thereof a socket to snugly receive the upper end of the bushing 52. A disk member 58 provided with a central aperture is welded to the underside of the drip pan, as shown in FIG. 4, with the central aperture thereof being coaxially aligned with the embossing 57. It will be understood that the auxiliary fire bowl 46 and drip pan 54 may be removed merely by lifting the same off of the spindle 42. As seen clearly in FIGS. 3 and 4, in assembling the fire bowl and drip pan on the spindle the bushing 52 is first placed over the upper end of the spindle with the bushing 52 coming to rest on the tapered end 45 of the spindle. The embossing 57 is then placed over the top of the bushing 52. In assembled relation, a portion of the drip pan 54 may rest on the supporting member 49, as illustrated in FIG. 4. It will be apparent that the drip pan and auxiliary fire bowl may be rotated about the axis of the spindle to any desired radial position. In such rotation the spindle, of course, rotates together with the drip pan and fire bowl.

The relative sizes and weights of the auxiliary fire pan 46 and drip pan 54 are such that these two elements are substantially in a condition of balance on the spindle. However, the spring-biased roller 38 in applying pressure to the left side of the spindle, as viewed in FIG. 4, opposite the auxiliary fire pan 46, assists in maintaining the aforesaid state of balance. Particularly, is this true when the fire pan 46 contains charcoal which adds additional weight to the fire pan.

Conventional means, not shown, preferably is provided for adjusting the spindle axially whereby to adjust the height of the auxiliary fire bowl and drip pan in relation to the article carried on the spit 21. Such means is shown, for example, in Patent No. 2,845,856.

As will be seen clearly in FIG. 2, the axis of the spit 21 is disposed in alinement with the axis of the spindle 42 so that any article being barbecued is arranged directly above the drip pan 54 and all drippings are caught in said pan. It will be understood that in use a fire is established in the auxiliary fire pan 46 in the usual manner and preferably the fire pan is disposed within the hood, as viewed in FIG. 2, so that the article being barbecued is cooked by direct heat from the fire and also by reflected heat from the hood 16.

If it is desired that the source of heat be disposed towards the front of the brazier, it is merely necessary to revolve the auxiliary fire pan to assume such a position.

My invention affords a versatile arrangement, since it is possible to use both the drip pan 54 and auxiliary fire bowl 46 as cooking surfaces when a fire is established in the main fire bowl 10. In the case where a fire in the main fire bowl 10 is localized, for example, in the area to the left of the spindle, as viewed in FIG. 3, the auxiliary fire bowl 46 may be used as a cooking surface over a maximum concentration of heat, while the drip pan 54 may be used merely as a warming surface, if desired.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. In combination, a main fire bowl having a tubular bushing rising upwardly through the bowl substantially at its center, a bearing collar rotatably supported on the lower end of the bushing below said fire bowl, a spindle passing through said bushing and having a longitudinally extending keyway, a member carried by said bearing collar in pivotal relation thereto, a roller carried by said member, spring means biasing said roller into engagement into said keyway, an auxiliary fire bowl eccentrically supported on the upper end of said spindle opposite said roller, said auxiliary fire bowl having a capacity substantially less than said main fire bowl and being disposed within the same.

2. In combination, a main fire bowl having a tubular bushing rising upwardly through the bowl substantially at its center, a substantially horizontal supporting member, a bushing rising upwardly through said supporting member and coaxially superimposed on said first mentioned bushing, a vertical spindle passing through said first mentioned bushing and having its upper end seated in said second mentioned bushing, an auxiliary fire bowl carried on said supporting member, a drip pan having means for supporting the same on said second mentioned bushing, said auxiliary fire bowl and said drip pan being each of generally segmental form and being disposed within said main fire bowl, said auxiliary fire bowl and said drip pan being oppositely disposed in generally coplanar relationship and eccentric to said bushings, and said auxiliary fire bowl and said drip pan being revolvable about the axis of said spindle, and spring biased means carried on said first mentioned bushing and engageable with said spindle for counterbalancing said auxiliary fire bowl.

3. In combination, a main fire bowl having a tubular bushing rising upwardly through the bowl substantially at its center, a substantially horizontal supporting member, a bushing rising upwardly through said supporting member and coaxially superimposed on said first mentioned bushing, a vertical spindle passing through said first mentioned bushing and having its upper end seated in said second mentioned bushing, an auxiliary fire bowl carried on said supporting member, a drip pan having means for supporting the same on said second mentioned bushing, said auxiliary fire bowl and said drip pan being each of generally segmental form and being disposed within said main fire bowl, said auxiliary fire bowl and said drip pan being oppositely disposed in generally coplanar relationship and eccentric to said bushings, said auxiliary fire bowl and said drip pan being revolvable about the axis of said spindle, and means carried on said first mentioned bushing for counterbalancing said auxiliary fire bowl, said means including a pivoted member carried on said first mentioned bushing below said main fire bowl, and spring means biasing said pivoted member against said spindle.

4. In combination, a main fire bowl having a supporting element substantially at its center, an auxiliary fire bowl, a drip pan, said auxiliary fire bowl and drip pan each having a capacity substantially less than said main fire bowl and being disposed within the same, said auxiliary fire bowl and drip pan each being independently supported on said supporting element eccentrically thereof and opposite each other, said supporting element comprising a rotatable spindle, a bearing collar depending from said main fire bowl and receiving said spindle, means keying said auxiliary fire bowl to said spindle, and spring biased means carried on said collar and acting on said spindle at a point opposite said auxiliary fire bowl.

References Cited in the file of this patent
UNITED STATES PATENTS

| | | |
|---|---|---|
| D. 160,688 | Brock | Oct. 31, 1950 |
| 874,933 | Bristow | Dec. 31, 1907 |
| 1,010,169 | Noreck | Nov. 28, 1911 |
| 1,531,517 | Simmons | Mar. 31, 1925 |
| 2,797,633 | Goodwin | July 2, 1957 |
| 2,819,667 | Victor | Jan. 14, 1958 |
| 2,950,712 | Terry | Aug. 30, 1960 |